United States Patent [19]

Kroger

[11] 3,829,886

[45] Aug. 13, 1974

[54] BISTABLE SEMICONDUCTOR TEMPERATURE SENSOR

[75] Inventor: Harry Kroger, Sudbury, Mass.

[73] Assignee: Sperry Rand Corporation, New York, N.Y.

[22] Filed: May 21, 1973

[21] Appl. No.: 361,924

[52] U.S. Cl. ..... 357/28, 357/13, 357/57, 357/23 307/310, 307/324

[51] Int. Cl. ..... H01l 3/00

[58] Field of Search ..... 317/235 Q, 235 T, 235 K, 317/235 B; 307/310, 324

[56] References Cited

UNITED STATES PATENTS

| | | | |
|---|---|---|---|
| 3,060,327 | 11/1962 | Dacey | 307/88.5 |
| 3,422,321 | 1/1969 | Tombs | 317/235 |
| 3,437,891 | 4/1969 | Yamashita | 317/235 |
| 3,453,887 | 7/1969 | Wooten | 73/362 |
| 3,454,847 | 7/1969 | Zuleeg | 317/235 |
| 3,500,142 | 3/1970 | Kahng | 317/235 |
| 3,624,895 | 12/1971 | MacIver | 29/570 |

*Primary Examiner*—Martin H. Edlow
*Attorney, Agent, or Firm*—Howard P. Terry

[57] ABSTRACT

A bistable semiconductor switching device for attachment to apparatus to be protected from overheating employs a diode configuration with a non-linear resistance layer and uses controlled conduction characteristics for providing major sensitivity to temperature of the transition point in the switching device between low and high impedance states. The existence of a transition point is sought by placing a wave form having a repeating envelope across the switching device. If, at some time after the start of the wave form, the sensor device makes a transition from its high to its low impedance state, the sensed large increase in current flowing through the switching device operates an alarm for warning purposes or other actuatable device for control purposes. Alternatively, temperature may be computed and directly displayed on the basis of the sensed transition point.

15 Claims, 20 Drawing Figures

BISTABLE SEMICONDUCTOR TEMPERATURE SENSOR

BACKGROUND OF THE INVENTION

1. Field of the Invention

The invention generally relates to the field of temperature sensing devices and more particularly is concerned with temperature sensing elements having an abrupt transition between high and low impedance states which may be used for overheat alarm or safety control purposes.

2. Description of the Prior Art

Generally, prior art temperature sensors yield relatively low output currents or voltages which vary slowly with changing temperature. The conventional thermocouple, for example, always requires the use of an electrical amplifier because of the small power and low voltage delivered by the thermocouple. Other temperature sensors, such as bimetal switches, employ moving parts and are sensitive to vibration and shock. Furthermore, the bimetal strip device slowly opens or closes an electrical contact with resultant arcing which produces undesirable radio interference. For control of any instrument drawing considerable power, such prior art devices do not reliably break large currents, and therefore require the expense of additional amplifiers or power relays.

SUMMARY OF THE INVENTION

The present invention relates to temperature sensing semiconductor devices having an abrupt switchable transition in current carrying capacity at a temperature dependent threshold voltage. Use is made of the non-linear characteristics of a dielectric or resistive layer within the semiconductor device in a configuration that provides a relatively constant rate of removal of charges through the non-linear resistive layer, but a highly temperature-dependent rate of injection of such changes because of the selected semiconductor materials. With constant bias, the device switches abruptly from a high impedance state to a low impedance state at a predetermined temperature, consequently permitting high electrical current flow above the predetermined temperature. In the low impedance state of the device, it can therefore support heavy flow of electrical current, so that the device functions, in effect, as if provided internally with its own power relay or amplifier. The sensor device is related to that described in the H. Kroger, H. A. R. Wegener U.S. patent application Ser. No. 354,727 for a "Controlled Inversion Bistable Switching Diode" filed Apr. 25, 1973 and also to that described in the H. Kroger U.S. patent application Ser. No. 354,279, for a "Controlled Inversion Bistable Switching Diode Device Employing Barrier Emitters," filed Apr. 25, 1973; both applications are assigned to the Sperry Rand Corporation. However, the structure and principles of operation will be seen to contrast sharply.

The novel temperature sensor finds application in a variety of temperature sensing systems in which the impedance transition point is sought by placing a repeating voltage wave such as a ramp-like wave across the device. At the transition point, the sensed large increase in current flow is employed to operate an alarm for warning purposes or other actuatable devices for control or safety purposes. Temperature may be directly displayed on the basis of the sensed transition point.

DESCRIPTION OF THE PREFERRED EMBODIMENTS

Figure 1:
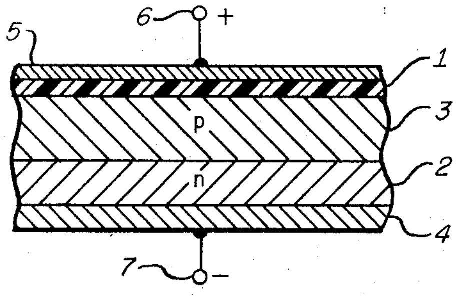
FIGS. 1 and 2 are elevation views in cross section of alternative forms of the novel bistable semiconductor temperature sensor.
Figure 2:
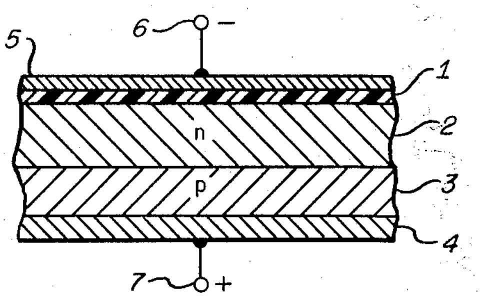

The temperature sensitive semiconductor relay systems of the present invention depend upon the unique features of a semiconductor temperature sensor device, of which alternative forms are shown in FIGS. 1 and 2. The temperature sensor device employs the special non-linear resistance characteristics of a dielectric layer in a semiconductor diode configuration for abrupt current switching purposes. Referring to both of FIGS. 1 and 2, which figures represent sections of alternative forms of the thin semiconductor diode sensor, layer 1 is formed of a special non-linear resistive material as will be described, and is placed upon a semiconductor body including the respective type n and type p conductivity layers 2 and 3. The non-linear layer 1 is in both cases covered with a conductive metal layer 5 to which an ohmic lead 6 is attached. Opposite the non-linear layer 1, there is formed on the semiconductor body comprising layers 2 and 3 a conductive metal layer 4 to which an ohmic lead 7 is attached. The respective type *n* and type *p* or *p*+ layers 2 and 3 in FIG. 2 are reversed in location with respect to their positions in FIG. 1, and the bias voltage applied to the respective terminals 6 and 7 is reversed. The substrate layer 2 in FIG. 1 may be, for example, a type *n* semiconductor layer with the type *p* layer 3 epitaxially grown upon it in a conventional manner.

Referring particularly to the form of the invention shown in FIG. 1 by way of illustration, a typical construction may be described as using silicon for the materials of layers 2 and 3 doped in a conventional manner and having respective thicknesses of approximately 15 and 5 microns. The non-linear resistive layer 1, which will be further discussed, will preferably be a silicon oxynitride layer about 20 Angstrom units thick and may be covered with a layer of evaporated molybdenum about $2 \times 10^{-5}$ to $2 \times 10^{-6}$ centimeters thick. The ohmic layer 4 at the semiconductor layer 3 may also be formed in the usual manner of a layer of evaporated chromium or other metal about $2 \times 10^{-6}$ centimeters thick. Representative areas of each of the layer interfaces are $5 \times 10^{-4}$ square centimeters, though devices with much smaller or larger areas may readily be realized.

Materials which display the suitable non-linear resistive properties desired for layer 1 include materials such as silicon nitride, silicon oxynitride, silicon-rich silicon nitride, silicon-rich silicon oxynitride, or mixtures thereof, materials generally classified herein as nitrides of silicon. In general, controlled methods for formation of desirable layers of such non-linear resistive materials are similar to those established in the art; for example, production of a silicon nitride layer on a semiconductor substrate is taught generally in the U.S. Pat. No. 3,573,096, issued Mar. 30, 1971 to N. C. Tombs for a "Silane Method of Making Silicon Nitride," assigned to Sperry Rand Corporation. Also of general interest are the N. C. Tombs U.S. Pat. No. 3,422,321, issued Jan. 14, 1969 for "Oxygenated Silicon Nitride Semiconductor Device and Silane Method of Making Same," and the R. I. Frank and W. L. Moberg U.S. Pat. No. 3,629,088, issued Dec. 21, 1971 for a "Sputtering Method for Deposit of Silicon Oxynitride," both patents being assigned to the Sperry Rand Corporation.

Figure 3:
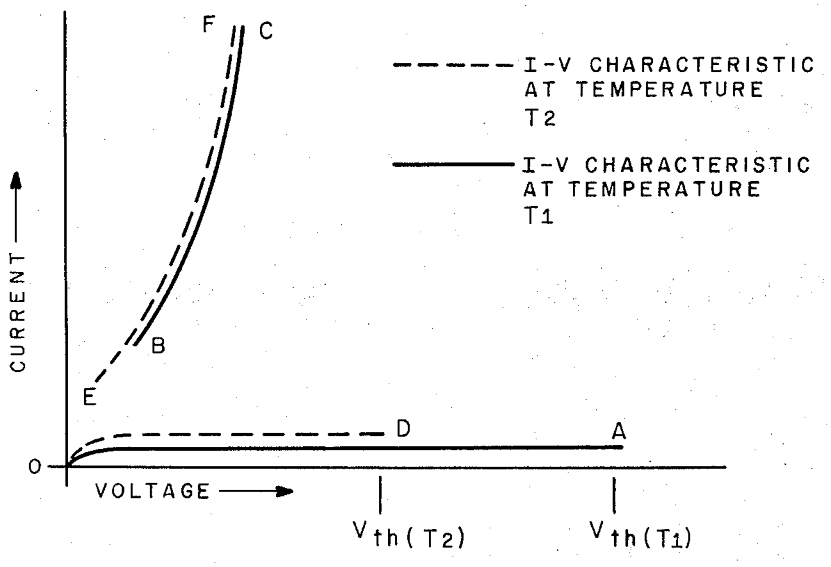
FIGS. 3 and 4 are graphs useful in explaining the operation of the devices of FIGS. 1 and 2.

When voltage-biased in the respective senses indicated in FIGS. 1 and 2, either structure demonstrates the abrupt switching characteristics graphically illustrated in FIG. 3. The bias voltage, when applied to either of the complementary devices of FIG. 1 or 2, tends to forward bias the *p-n* or $p^+$-*n* junction or to tend to deplete the semiconductor material adjacent non-linear layer 1. If the bias is applied in the aforementioned manner, the device demonstrates the current-voltage characteristics of FIG. 2. If the device at temperature $T_1$ is initially placed in the zero bias voltage condition, it will follow the current-voltage characteristic of the solid line 0-A of FIG. 3 as the bias is increased until the bias voltage reaches a maximum or threshold voltage $V_{th(T_1)}$. An abrupt switching mechanism will operate if an attempt is made to increase the bias voltage above the value $V_{th(T_1)}$. The switching event manifests itself as a rapid transition from a high to a low impedance stated characterized by the curve B-C of FIG. 3.

The switching point, according to the present invention, is designed to be very sensitive to temperature. For example, if the device is at a second or higher temperature $T_2$ and the bias voltage is increased, the dotted curve 0-D, which may lie substantially on line 0-A, shows the switching transition occurring at a relatively lower voltage $V_{th(T_2)}$. The transition is to the low impedance state depicted by the dotted line E-F of FIG. 3. Line E-F may lie substantially on top of line B-C. The highest value of $V_{th}$ is arranged to permit switching well below the critical voltage across the diode structure that would cause either avalanche or Zener breakdown in the semiconductor material.

Figure 4:
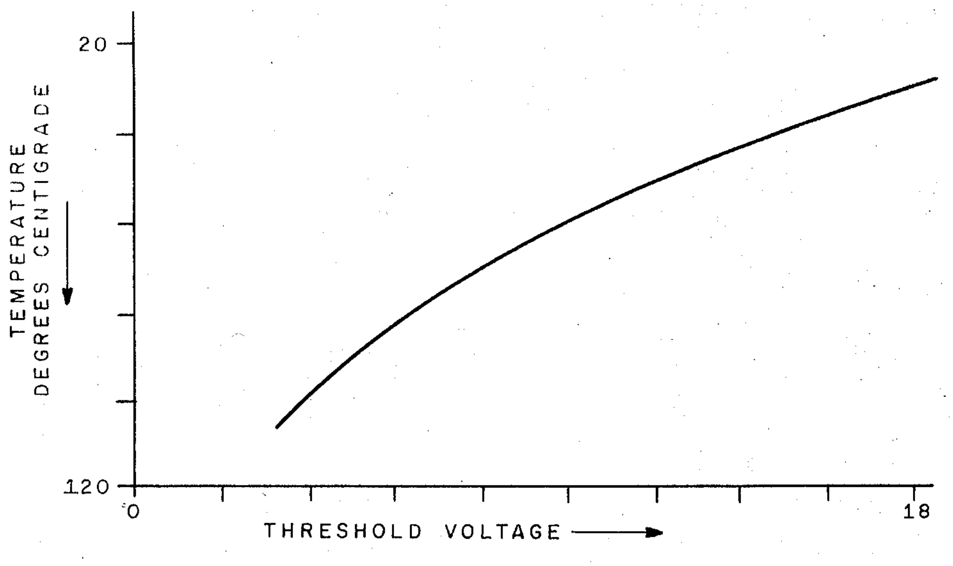

Accordingly, it is seen that the novel semiconductor sensor can be supplied with a variable bias voltage and can be used as a thermometer by, in effect, measuring the threshold voltage $V_{th}$ of the device as a function of temperature. It has been found that there is a calibratable relation between the threshold voltage $V_{th}$ and the temperature of the device over a wide temperature range, a range greater than 100° Centigrade in certain cases, with a sensitivity of one volt per degree Centigrade. That relation for a typical device is illustrated in the graph of FIG. 4. The structure for that particular device employed a molybdenum contact 5 bonded to a 20 Angstrom unit thick silicon oxynitride substantially trap-free layer which covered a 5 ohm-centimeter type *n* silicon layer of 10 microns thickness, the type n layer having been grown epitaxially upon a $p^+$ substrate to form a $p^+$-*n* junction therebetween.

It is found experimentally that the largely resistive impedance of the non-linear layer 1 and therefore of the total diode sensor structure can change in less than 5 nanoseconds between the two states by a factor as great as $10^5$ to $10^7$. In a typical example, the high impedance state of the diode presented a resistance of greater than $10^6$ ohms, while its low impedance state had a resistance of less than 50 ohms.

It will be appreciated that a novel feature dominating the operating characteristics of the bistable temperature sensor lies in the nature of the conducting mechanism within insulative layer 1. The device of FIG. 1 is again shown, for example, in FIG. 5 where it will be further discussed in relation to the graphs of FIGS. 6, 7, and 8, which graphs plot the amplitude of the electric field along the device under three differing bias voltage circumstances.

Figures 5, 6:
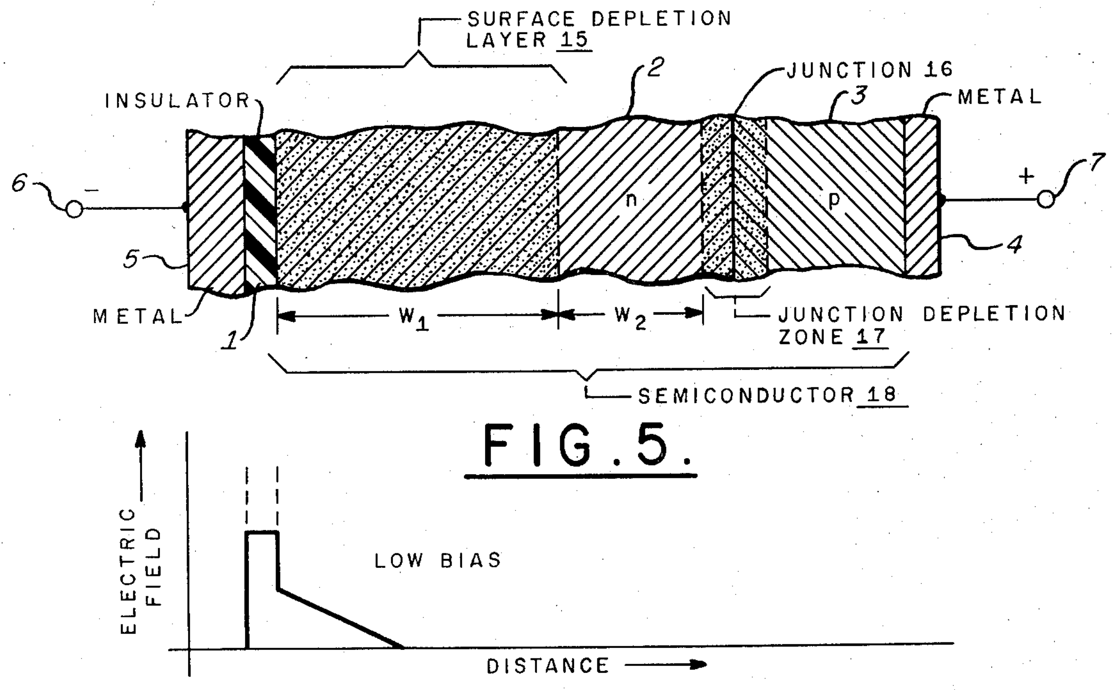
FIG. 5 is a view similar to FIGS. 1 and 2 useful in explaining the operation of the sensor.
FIGS. 6, 7, and 8 are graphs of the electric field across the sensor of FIG. 5 in three different situations.
Figure 7:
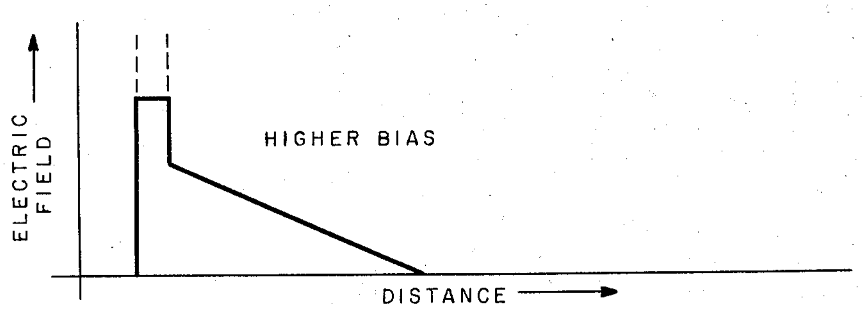

Starting with the zero bias voltage situation at constant temperature for purposes of explanation, the high impedance state of the diode sensor is characterized in FIGS. 6 and 7 by a widening depletion zone 15 within the type n layer 2 adjacent non-linear layer 1. As the field is increased from the FIG. 6 to the FIG. 7 situation at constant temperature, the depletion layer 15 extends to a distance $W_1$ from non-linear resistive layer 1. When the bias voltage almost reaches the threshold voltage value $V_{th}$, the depletion layer 15 has a steady state width W, much greater than it could have if the non-linear resistive layer 1 were a pure insulator; evidently, an undesired inversion layer would of necessity form at the surface of semiconductor layer 2 common with layer 1 if that layer did not conduct at all. The inversion event would limit further extension of the depletion layer 15 if the material of layer 1 was a pure insulator. In addition, inversion layer formation would cause almost all of the total voltage drop to appear across the non-linear layer 1; a bias voltage even of moderate value would irreversibly damage the insulative layer 1 under normal operating conditions.

In the present invention, the depletion layer 15 of FIG. 5 is allowed to increase in extent in the high impedance state of the device, permitting the existence of a relatively high value of the threshold valtage $V_{th}$; such is accomplished because an inversion layer is not permitted to form. In its high impedance state, the only possible mechanism for preventing the formation of the undesired inversion layer is actual controlled conduction of electrons through the non-linear resistive layer 1. Conduction through the non-linear layer in the high impedance state is in sufficient quantity substantially to annihilate the majority carriers that would form an inversion layer at the interface between non-linear resistive layer 1 and semiconductor layer 2. The exact mechanism of operation of the sensor may differ from the foregoing at least in detail, and the discussion herein is not intended to be interpreted in a limiting sense.

Figure 8:
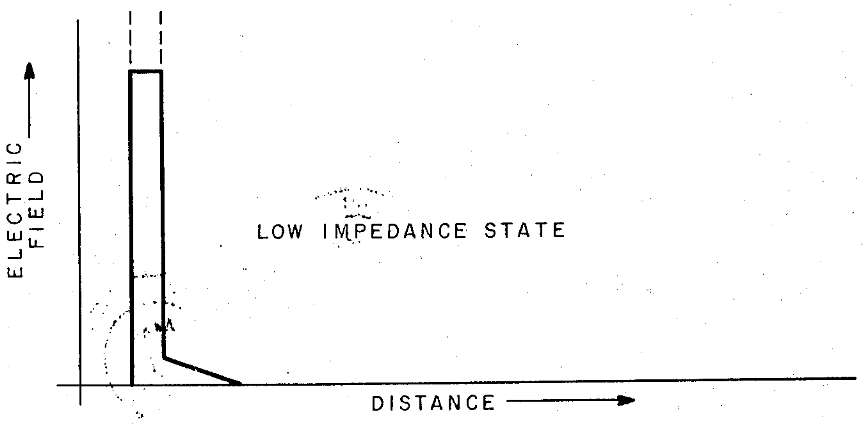

At all times, except during the actual instant of transition between high and low impedance states, the sensor device of the present invention is in a state of dynamic equilibrium expressed by the requirement of steady-state current continuity. If the bias voltage applied to terminals 6, 7 is increased to a value with respect to $V_{th}$ which prohibits current continuity, then switching must occur to achieve a new internal state of electric field distribution as seen in FIG. 8, but a state in which current continuity throughout the device again prevails. The conduction of the non-linear layer 1 is greatly increased in a low impedance state, not only because of the higher electric field associated with the inversion, but also because of the highly non-linear conductivity of layer 1, as will be discussed.

The new steady state low impedance condition is characterized by a greatly increased voltage drop across the non-linear resistive layer 1, a requirement that can be realized only if an inversion layer is now actually formed at the non-linear layer 1 by the increased rate of arrival of minority carriers injected by the junction 16 of FIG. 5. The low-impedance state is thus marked by a relatively low voltage across the sensor device, even though the electric field across the non-linear layer 1 is high. The new equilibrium is achieved only when the electric field across the non-linear layer 1 is great enough that minority carriers are moved rapidly from the junction depletion region 16 through layer 1 as fast as the junction 16 may supply them. The field shown in FIG. 8 across layer 1 may be as high as $10^6$ to $10^7$ volts per centimeter, so that the dielectric strength of layer 1 should be selected to be as high as possible to prevent catastrophic breakdown therethrough. It is thus seen that the conductance of the novel device is controlled by the semiconductor's surface depletion zone 15. In the high impedance state, the device has large depletion layer widths with no inversion layer formation until the bias is nearly equal to the threshold value $V_{th}$. The normal tendency to form an inversion layer is thwarted by a small but finite current conducted through non-linear layer 1. In the low impedance state, on the other hand, the semiconductor surface is strongly inverted with a collapsed depletion zone. It will also be understood that, if the ratio of current in the low impedance state to the current in the high impedance state is to be high for a given dielectric strength of the non-linear resistive layer 1, the dielectric material must demonstrate highly non-linear characteristics with greatest conductance occurring at high fields.

The threshold voltage $V_{th}$ is always less than that voltage required completely to deplete the type n region 3 which is the punch-through voltage. The punch-through voltage is less than the avalanche break down voltage of the surface depletion region 15. Variation of the voltage across the surface depletion zone effects not only the conductance of the non-linear layer 1, but also the rate of hole injection from the *p-n* or *$p^+$-n* junction into the epitaxial type n layer 3, even though punch-through does not occur. Higher applied biases reduce the width of the neutral (undepleted) type n layer 3 between the junction 16 and surface depletion zone 15. Physically, the threshold voltage $V_{th}$ is attained when the current supplied by the junction 16 is so great that the current through the non-linear layer can not keep pace with it. Thus, current continuity can not be maintained across the entire device without an internal rearrangement of the field distribution.

As has been previously observed, it is desired in the present invention that the threshold voltage level $V_{th}$ changes widely with the temperature of the sensor in a repeatable manner. Accordingly, the preferred embodiment of the sensor incorporates as the non-linear resistive layer 1 a layer of material whose conduction mechanism is as insensitive to temperature as possible. Such can be achieved, for example, by using substantially trap-free resistive materials of extreme thinness wherein the predominant conduction mechanism is tunneling. The relative importance of tunneling may be enhanced by use of a very thin resistive layer 1; for example, about 20 Angstrom units thick. Nitrides of silicon may be vapor deposited for this purpose. The temperature sensitivity of the threshold voltage $V_{th}$ is made large by selecting a semiconductor material having a large dependence of forward current magnitude upon temperature from those having large band gaps. While silicon has been discussed as a typical and very satisfactory material, other large band gap semiconductors such as gallium arsenide or other Group III–V mixed crystal semiconductors are useful. Also, junctions formed by ion implantation in Group II–VI materials such as cadmium sulfide and zinc oxide have suitable characteristics.

It is thus seen that the novel semiconductor sensor provides the desired temperature sensitivity. Use is made in the invention of an understanding of the dynamic imbalance which may exist between the arrival and removal at the insulator-semiconductor interface (the interface between layers 1 and 2) of charges for a device biased just below the threshold voltage $V_{th}$ at a given temperature. At such a condition, the conductance of non-linear layer 1 is just sufficient to remove the minority carriers from this interface at substantially the same rate as they arrive without the formation of the inversion region within semiconductor layer 2 at layer 1. Now, if the temperature is raised by a small increment, it is found that the rate of arrival of minority carriers injected by junction 16 increases more rapidly than the rate of removal by conduction through non-linear resistance layer 1 and an inversion layer must form, causing the device rapidly to switch to its low impedance state. In order to achieve the demonstrated temperature sensitivity of the switching operation, tunneling is used primarily as a conduction mechanism for a thin resistive layer 1.

The conductance of the non-linear resistive layer 1, by the proper choice of a material such as silicon nitride or silicon oxynitride, is made to depend non-linearly upon the electric field strength across layer 1 to the extent that, when an inversion layer is formed in semiconductor layer 3, the non-linear layer 1 can pass large current densities at electric fields that are far enough below its electrical break down strength that the layer is not damaged. A vapor deposited, high resistance silicon nitride or oxynitride layer 1 offers significantly improved operation because of the desired low density of traps introduced by controlled vapor deposition. The temperature dependence of such non-linear layer differs considerably from the temperature dependent characteristic of the forward biased junction.

Thus, the threshold voltage $V_{th}$ varies significantly with temperature.

Specifically, the choice of a vapor deposited silicon oxynitride having an average visible optical index of refraction about 1.75 is advantageous for use as layer 1, also because of its high dielectric strength. For example, such silicon oxynitride layers may readily be grown reproducibly which have dielectric strengths in excess of $2 \times 10^7$ volts per centimeter. Because of this high dielectric strength, high electric fields may be imposed across non-linear resistive layer 1, which permits currents of densities in excess of 200 amperes per square centimeter to flow through the thin insulative layer 1 without damage thereto. More highly-conductive nitride layers have also been used with success.

A preferred method of making the non-linear layer 1 from silicon oxynitride so that it has the desired non-linear conductivity and dielectric strength properties is by a pyrolytic deposition method that is a variant of prior art methods for generating highly insulating passivating layers and the like. In constructing the device of FIG. 1 with a silicon oxynitride layer 1, the reaction of silane, ammonia, and nitrous oxide is carried out, for example, in a horizontal quartz reactor tube in which the semiconductor body 2, 3 has been supported with the exposed surface to be coated previously prepared by mechanical polishing and cleaning. The temperature of the body 2, 3 within the reactor is elevated in the presence of a flow of reagent gas. The preferred composition of the reagent gas during deposition is substantially 0.04 per cent by volume silane ($SiH_4$), 4 per cent by volume of ammonia ($NH_3$), and 0.25 per cent of nitrous oxide ($N_2O$), with the remaining part of the volume being argon as an inert carrier. The total rate of flow of the reagent gas through the reactor vessel is about 10 liters per minute with the silicon semiconductor body being held at 700° Centigrade, for example. The thickness of the layer thus formed is generally proportional to the time that the treated surface of the body 2, 3 is exposed to the reagent gas, being typically 20 Angstrom units after a 30 second exposure.

Other similar non-linear resistive materials may be employed, such as silicon nitride, which may also be grown pyrolytically. In this instance, the composition of the reagent gas may be 0.2 per cent of silane and 2 per cent ammonia with the bulk of the volume again provided by argon. The total flow of the gas through the horizontal reactor may be approximately 10 liters per minute with the temperature of the semiconductor body 2, 3 at 700° Centigrade. The time required to deposit 200 Angstrom units of silicon nitride in this situation is about 20 seconds. A range of reagent gas constituent variation may involve the variation of silane content from 0.004 to 4 per cent by volume while maintaining the ammonia component content at 4 per cent. Independent variation of the nitrous oxide may cover a range of 0.004 to 0.4 per cent by volume.

The contact layer 5 may be formed by evaporation of molybdenum, especially if the non-linear layer 1 is thin, molybdenum being highly adherent to insulative layers. The molybednum layers 4 and 5 may further be coated in the conventional manner with gold to protect the molybdenum from deterioration due to oxidation and to increase the ease of bonding of leads 6 and 7 to the device. In the instance of a relatively thick non-linear layer 1, the molybdenum layer 4 may be replaced by a thin evaporated layer of chromium (about 400 Angstrom units thick) covered by a layer of evaporated gold (about 2,000 Angstrom units thick) to which lead 6 is directly attached by soldering or by thermocompression.

It will be understood that the dimensions and proportions used in the several figures thus far discussed are used with a view of presenting the invention with clarity, and are not necessarily the dimensions or proportions which would be used in constructing the novel sensor device for a particular application. Also, for ease in understanding the operation of the invention, the phases non-linear materials, non-linear resistive materials, and the like are intended to refer to a class of materials of which pyrolitically deposited silicon nitride and silicon oxynitride and other nitrides of silicon are examples. These materials exhibit conduction at high applied electric fields, and very little or no conduction at relatively low fields. They also present significant non-linearity of conduction under different electric field gradients with respect to a temperature variable threshold voltage which demarks low and high impedance states.

Figure 9:
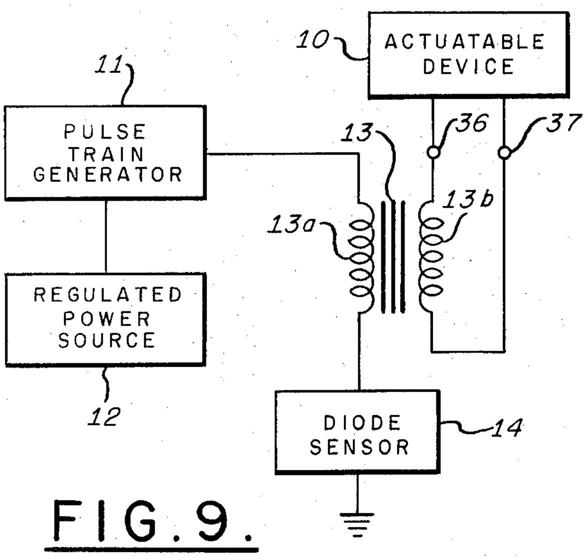
FIGS. 9, 9A, and 10 are circuit drawings of alternative arrangements for the novel sensor, showing electrical components and their interconnections.

The versatility of the invention is further demonstrated by its ready adaptability to use in a variety of temperature sensing arrangements. For example, in FIG. 9, the semiconductor temperature diode sensor 14 of FIGS. 1 or 2 is shown in use in a system for operating an actuatable device 10 when the diode sensor reaches a predetermined temperature. A pulse train generator 11, which may, if desired, generate a train of regularly spaced pulses or generate a single pulse on demand, is powered by a regulated power source 12 which is provided with conventional means for ensuring regulation of its output amplitude against power line or temperature variations. The output pulse or pulses from generator 11 are coupled through a current sensor 13 and through a diode temperature sensor 14 such as that of FIGS. 1 or 2. The current sensor 13 may be a simple current transformer having input and output windings 13*a* and 13*b*; other types of current samplers or sensors may be employed, such as conventional capacity or tapped resistive pick offs. In the example of FIG. 9, the current pulse sensed induces a transient current in output coil 13*b* which is coupled directly to an actuatable device 10.

Figure 9A:
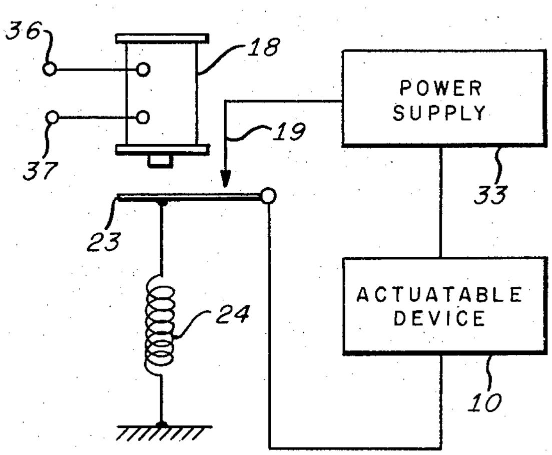

As previously noted, the high output current level characterizing the novel sensor 14 is sufficient directly to operate many devices which would require the use of additional power relays or amplifiers in the instance of use of conventional bimetal or thermocouple temperature sensors. Where an actuatable device 10 of even high power capacity is used, the modification of FIG. 9A be chosen. The output of coil 13*b* is not coupled directly to actuatable device 10, but is coupled by terminals 36, 37 through the electro-magnetic solenoid of relay 18. A current pulse greater than a predetermined amplitude will readily move armature 23 upward by overcoming spring 24, thereby closing armature 23 against contact 19. Closure of contact 19 permits current to flow from power supply 33, which may be the same source as source 12, thus operating actuatable device 10. Device 10 in both instances may be a simple warning light, bell, or horn which is actuated above a predetermined temperature of diode sensor 14. On the other hand, actuatable device 10 may comprise a switch, valve, or other element for any of various control purposes, such as a switch for stopping the operation of a gasoline or other engine. In general, relay 18, 19, 23, 24 is arranged to cause contact 19 to remain open as long as diode sensor 14 does not transfer to its low impedance state. However, the moment that the rising temperature of the machine or other element to which diode sensor 14 is attached reaches a predetermined dangerous level, the relay operates to close contact 19 against armature 23 and the actuatable alarm or control device 10 is operated. Device 10 may then operate as a flashing lamp or an intermittently sounded horn. The relay may also be a conventional latching type of relay, so that once a predetermined temperature is sensed by diode sensor 14, device 10 is permanently actuated until manually re-set. Pulse train generator 11 may be eliminated, if desired, and the voltage from regulated power source 12 may be applied directly to winding 13*a*. In this situation, the abrupt current transient induced in winding 13*b* may be employed to actuate the actuatable device 10. The user of the device may determine the temperature at which device 10 is operated by suitably adjusting the bias applied to diode 14 by source 12. Higher biases cause the transition of diode 14 to the low impedance state to occur at lower temperatures, and vice versa.

Figure 10:
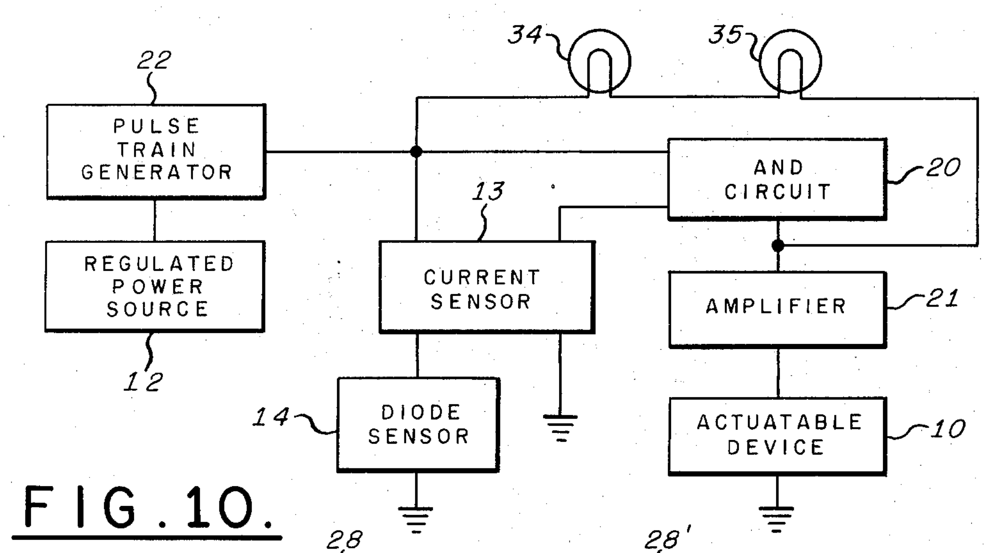

In FIG. 10, certain elements may be the same as those of FIG. 9 and therefore bear similar reference numerals, including regulated power supply 12, current sensor 13, diode sensor 14, and actuatable device 10. For permitting a novel mode of operation, a pulse train generator 22 of conventional kind transmits successive trains of pulse 25, 26, 27, 28 (FIG. 11), in which each succeeding pulse is different in amplitude than its immediate predecessor, for example. Regularly increasing or decreasing amplitude pulses may be used. In other applications, it is not necessary for the pulse train to be made up of monotonically increasing (or decreasing) pulses, or that the amplitude change by regular increments. If the first or second pulses 25, 26 do not cause sensor 14 to change to its low resistivity state, but pulse 27 does, it is apparent that diode sensor 14 has reached the temperature such that $T_{27} > T > T_{26}$. The transition event is detected by supplying the pulse train from generator 22 and the pulses produced in the low impedance state of diode sensor 14 to a conventional coincidence or AND circuit 20, whose output is representative of the actual temperature of diode sensor 14 and therefore of the device to which sensor 14 is attached.

Figure 11:
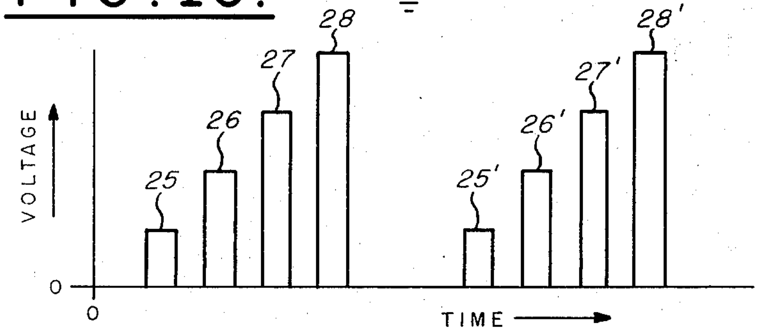
FIGS. 11 and 12 are graphs of voltage and current wave forms useful in explaining the operation of the apparatus of FIG. 10.
Figure 12:
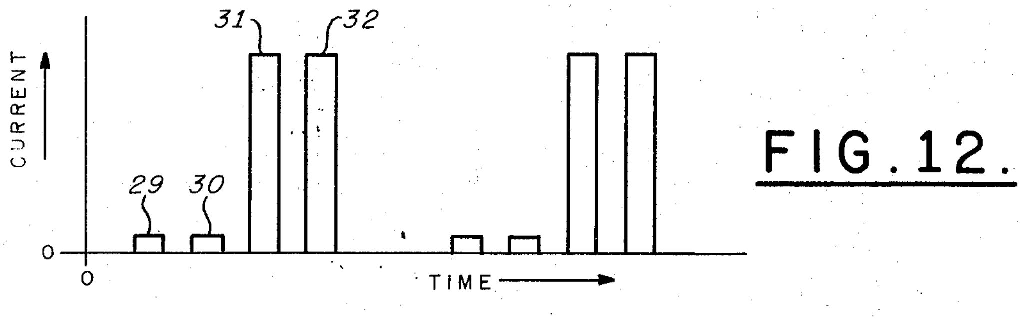

A variety of displays or other actuatable devices 10 may be used in the apparatus of FIG. 10, such as the flashing lamp warning indicator 34, 35. For example, where the time constant of the monitored device is large, a reference lamp 34 may be made to flash at two-second time intervals for each pulse of pulse train 25, 26, 27, 28, there being a four-second or larger interval before the succeeding pulse train 25', 26', 27', 28' begins. In the illustration of FIGS. 11 and 12, it is seen that pulses 25, 26 of FIG. 11 do not drive appreciable current through diode sensor 14 and therefore, through current sensor 13 for a particular temperature level. However, the assumed temperature level is such that pulses 27, 28 cause significant conduction in the form of current pulses 31, 32 of FIG. 12. AND circuit 20 is then actuated and lamp 35 is consequently ignited simultaneously with lamp 40, but only for the duration of current pulses 27, 28 of FIG. 11. A suitable threshold circuit may reside within AND circuit 20, if desired. By way of further example, when the measured temperature is at a safe level, warning lamp 35 is never ignited, and only lamp 34 operates, producing successive quartets of flashes. Should the monitored temperature reach an unsatisfactory level, lamp 35 will flash once for each pulse quartet and coincident with the fourth flash of each quartet, an event easily detected by the eye. With increasing temperature, lamp 35 will flash in coincidence with the third and fourth flashes of each quartet of flashes of lamp 34, and so on. The amplifier 21 of FIG. 10 will be required only in the relatively few instances in which a large amount of power must be drawn to operate actuatable device 10. An important advantage of the diode sensor is that, in the low resistance state, the device can deliver relatively large current amplitudes, more than 100 amperes per square centimeter of the device area so that, in most applications, amplifier 21 is not required.

Figure 13:
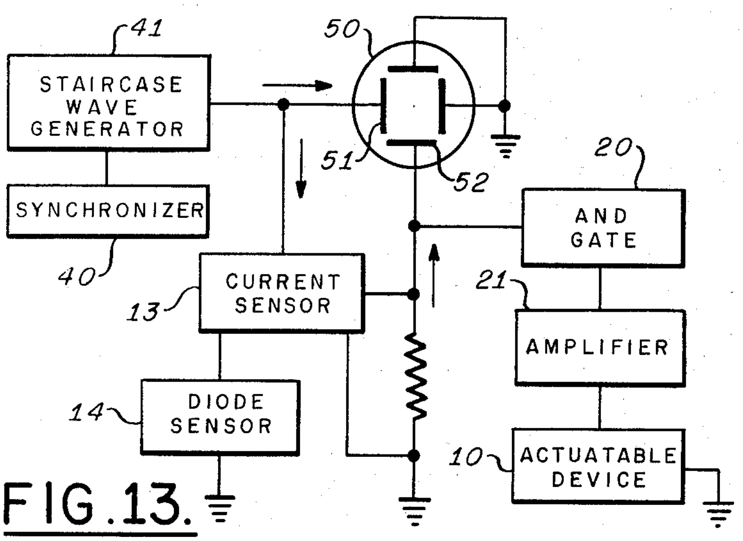
FIG. 13 is an arrangement alternative to that of FIG. 10.
Figure 13A:
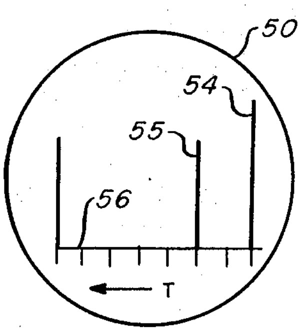
FIG. 13A is a view of the face of the indicator shown in FIG. 13.
Figure 14:
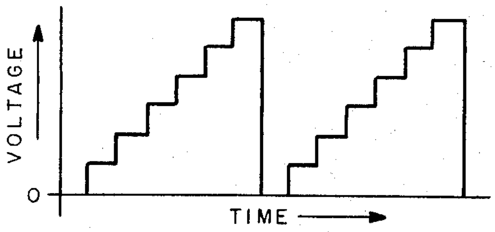
FIGS. 14 and 15 are graphs of voltage and current wave forms useful in explaining the operation of the apparatus of FIG. 13.
Figure 15:
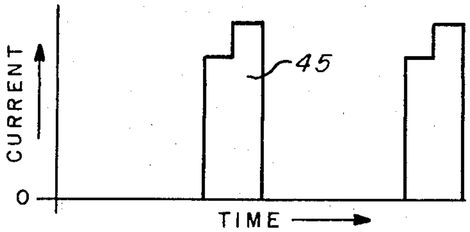

It is within the scope of the invention to use wave forms other than separated pulse wave forms for exciting diode sensor 14, such as the staircase wave of FIG. 14. A system for use of such a wave is shown in FIG. 13, where current sensor 13, diode sensor 14, AND circuit 20, amplifier 21, and actuatable device 10 are elements similar to corresponding elements in FIGS. 9 and 10. However, the wave form of FIG. 14 is supplied to current sensor 13 and diode sensor 14 by a staircase wave generator 41 under control of a conventional synchronizer 40. When the monitored device causes diode sensor 14 to transfer to its low impedance state, one or more of the latest steps of the staircase wave, as at 45 in FIG. 15, are passed to AND circuit 20. Since these late steps coincide with the latter portion of the staircase wave, the coincidence or AND circuit 20 passes a warning signal to actuatable device 10, which signal may first be amplified, if desired. The alarm signal may be used in the variety of ways previously discussed and in others, as well. For example, a voltage proportional to the staircase wave output of generator 41 may be applied directly or after amplification to the horizontal deflection plates of cathode ray tube indicator 50, while a voltage proportional to the output of current sensor 13 is placed on the vertical deflection plates. In the presence of the alarm signal 45 of FIG. 15, two vertical line traces 54 and 55 will be produced, as in FIG. 13A. Line 55 is the line with meaning and corresponds in horizontal location to the actual temperature of the monitored device. The line 54 will be ignored in the presence of line 55. Note that the temperature scale of the calibration 56 on the face of indicator 50 increases toward the left in the drawing, though the presentation may readily be reversed by means obvious to those skilled in the art of cathode ray oscillography.

Figure 16:
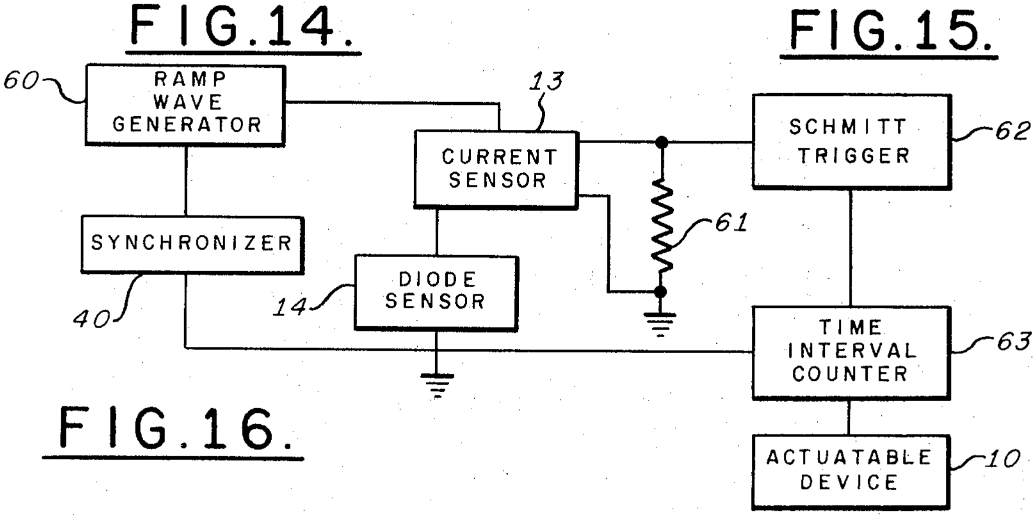
FIG. 16 is a further arrangement of the novel sensor system.
Figure 17:
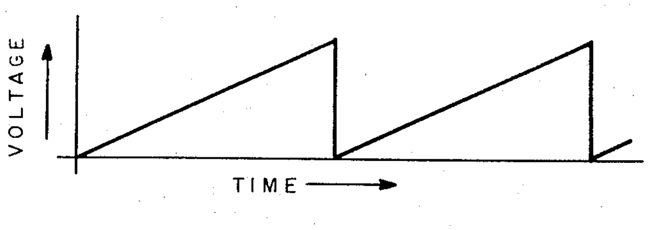
FIGS. 17 and 18 are graphs of voltage wave forms useful in explaining operation of the apparatus of FIG. 16.
Figure 18:
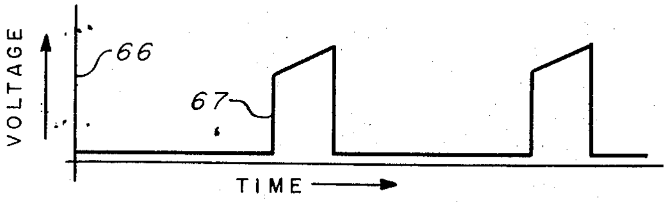

In the system of FIG. 16, the synchronizer 40, current sensor 13, diode sensor 14, and actuatable device 10 are again provided. Synchronizer 40 causes ramp wave generator 60 to produce the saw tooth wave of FIG. 17 for application through current sensor 13 and diode sensor 14. If the temperature monitored by diode 14 reaches a danger zone, the diode sensor 14 will conduct current heavily, and the voltage pulse shown at 67 in FIG. 18 appears across the output resistor 61. This pulse is coupled to a Schmitt or other pulse shaping trigger circuit 62. The output of trigger circuit 62 may be provided as one input to a conventional time interval counter 63. A second input of the latter is the synchronizing output pulse of synchronizer 40 which coincides in time with the start of the ramp wave of FIG. 17. Since trigger circuit 62 develops a uniformly short duration pulse with a leading edge correspondint in time to the starting edge 67 of the wave of FIG. 18, a conventional time interval counter 63 will yield directly a display of the time interval between lines 66 and 67 of FIG. 18. The number displayed is proportional to temperature and counter 63 may be calibrated directly in terms of temperature. It will also be apparent that a cathode ray tube display generally similar to that of FIG. 13a may be achieved.

Accordingly, it is seen that the invention provides a simple temperature sensing semiconductor device having an abrupt switchable trnasition in current carrying capacity at a temperature-dependent threshold voltage. Use is made of the bistable non-linear characteristics of a resistive layer within the semiconductor device in a configuration that provides a relatively constant rate of removal of charges by tunneling through the non-linear resistive layer, while also providing a highly temperature-dependent rate of injection of such changes because of the selected semiconductor material. With constant bias, the device switches abruptly from a high impedance state to a low impedance state at a predetermined temperature, consequently permitting high electrical current flow above the predetermined temperature. In the low impedance state of the device, it can therefore support heavy flow of electrical current so that the device functions, in effect, as if provided internally with its own power relay or amplifier.

Accordingly, the novel temperature sensor finds application in a variety of temperature sensing systems in which the impedance transition point is sought by placing a repeating ramp-like voltage wave across the device. At the transition point, the sensed large increase in current flow is employed to operate an alarm for warning purposes or other actuatable device for control or safety purposes. Temperature may be directly displayed on the basis of the sensed transition point.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Bistable semiconductor temperature sensor means comprising:

semiconductor body means having first and second surfaces, non-linear resistive layer means affixed to said first surface comprising a resistive material demonstrating first and second impedance states, conductive metal layer means affixed to said non-linear resistive layer means opposite said semiconductor body means, connector means adapted for applying a cyclically varying control voltage across said semiconductor means and said non-resistive layer means in cooperation with said conductive metal layer means, and semiconductor junction carrier generator means within said semiconductor body means, said semiconductor body comprising a large band gap semiconductor material having a large dependence of forward current magnitude upon temperature whereby a transition point between said first and second impedance states is a rapidly varying function of temperature.

2. Semiconductor diode means as described in claim 1 wherein said semiconductor junction carrier generator means provides means for generating a substantial inversion layer within said semiconductor body means at said non-linear resistive layer means in said first impedance state and substantially no inversion layer within said semiconductor body means at said non-linear resistive layer means in said second impedance state.

3. Semiconductor diode means as described in claim 1 wherein said semiconductor body means comprises silicon.

4. Semiconductor diode means as described in claim 1 wherein said non-linear resistive layer means comprises a pyrolytically deposited nitride of silicon.

5. Semiconductor diode means as described in claim 4 wherein said non-linear resistive layer means is selected from the group including silicon nitride, silicon oxynitride, silicon-rich silicon nitride, silicon-rich silicon oxynitride, or mixtures thereof.

6. Semiconductor diode means as described in claim 1 wherein said non-linear resistive layer means comprises a substantially trap-free material.

7. Semoconductor diode means as described in claim 5 wherein said conductive metal layer means comprises evaporated molybdenum.

8. Apparatus as described in claim 1 further including:

generator means for generating a variable voltage wave coupled to said connector means, current wave sensor means coupled in series relation with said connector means and said generator means for providing a substantial output wave only in the low impedance state of said bistable semiconductor temperature sensor means, and actuatable means responsive to said current wave sensor means in the presence of said output wave.

9. Apparatus as described in claim 8 wherein said generator means comprises wave generator means for cyclically producing waves having a ramp-like envelope.

10. Apparatus as described in claim 9 wherein said wave generator means cyclically produces discrete trains of discrete pulses, each discrete train having a substantially ramp-like envelope.

11. Apparatus as described in claim 9 wherein said wave generator means comprises stair case wave generator means.

12. Apparatus as described in claim 9 wherein:

said wave generator means and said current wave sensor means provide excitation for coincidence circuit means, and said actuatable means is responsive to coincidence indicating outputs of said coincidence circuit means.

13. Apparatus as described in claim 10 additionally including:

first display means responsive to said discrete pulses, and second display means adjacent said first display means responsive to said output wave of said current wave sensor means.

14. Apparatus as described in claim 9 further including:

synchronizer means for controlling the part of said cyclic generator means ramp-like wave, trigger pulse forming means responsive to said current wave sensor means, and time interval counter means jointly responsive to said synchronizer means and to said trigger pulse forming means, said actuatable means being directly responsive to said time interval counter means.

15. Apparatus as described in claim 10 additionally including unitary display means jointly responsive to said wave generator means and to said current wave sensor means.

* * * * *